United States Patent
Landsman et al.

(10) Patent No.: US 8,260,278 B2
(45) Date of Patent: Sep. 4, 2012

(54) FRAMEWORK FOR AGILE MOBILE APPLICATIONS

(75) Inventors: Seth M. Landsman, Arlington, MA (US); Brandon T. Wolfe, Tyngsboro, MA (US); Richard Byrne, Chelmsford, MA (US); John Wilson, Amherst, NH (US); Harry Sleeper, Bedford, MA (US); Juhan Sonin, Arlington, MA (US)

(73) Assignee: The MITRE Corporation, McLean, VA (US)

( * ) Notice: Subject to any disclaimer, the term of this patent is extended or adjusted under 35 U.S.C. 154(b) by 269 days.

(21) Appl. No.: 11/790,421

(22) Filed: Apr. 25, 2007

(65) Prior Publication Data

US 2007/0287482 A1    Dec. 13, 2007

Related U.S. Application Data

(60) Provisional application No. 60/799,658, filed on May 12, 2006.

(51) Int. Cl.
*H04M 3/00* (2006.01)

(52) U.S. Cl. .............. 455/418; 455/419; 455/414.2; 455/414.3

(58) Field of Classification Search .......... 455/418, 455/419, 3.01, 3.02, 3.03, 3.04
See application file for complete search history.

(56) References Cited

U.S. PATENT DOCUMENTS

| | | | |
|---|---|---|---|
| 6,560,604 B1 * | 5/2003 | Fascenda | 707/10 |
| 7,020,460 B1 * | 3/2006 | Sherman et al. | 455/415 |
| 7,251,495 B2 * | 7/2007 | Keyani et al. | 455/466 |
| 7,269,445 B2 * | 9/2007 | Natsuno et al. | 455/558 |
| 2002/0004705 A1 * | 1/2002 | Baron et al. | 702/3 |
| 2003/0143982 A1 * | 7/2003 | Wolters et al. | 455/414 |
| 2004/0064697 A1 * | 4/2004 | Lin et al. | 713/169 |
| 2004/0242246 A1 * | 12/2004 | Lee et al. | 455/466 |
| 2005/0170856 A1 | 8/2005 | Keyani et al. | |
| 2005/0209930 A1 * | 9/2005 | Coppinger et al. | 705/26 |
| 2006/0178140 A1 * | 8/2006 | Smith et al. | 455/427 |
| 2006/0249576 A1 * | 11/2006 | Nakada et al. | 235/382 |
| 2006/0259629 A1 * | 11/2006 | Usmani et al. | 709/227 |
| 2006/0294225 A1 * | 12/2006 | Grecco et al. | 709/224 |
| 2007/0016638 A1 * | 1/2007 | Elbury et al. | 709/201 |
| 2007/0287450 A1 * | 12/2007 | Yang et al. | 455/433 |

OTHER PUBLICATIONS

International Preliminary Report on Patentability, mailed Dec. 11, 2008, for PCT Patent Application No. PCT/US2007/010930, 8 pages.

International Search Report with Written Opinion of the International Searching Authority for International Application No. PCT/US2007/10930, prepared Aug. 15, 2008 and mailed on Oct. 1, 2008, 11 pages.

* cited by examiner

*Primary Examiner* — Rafael Pérez-Gutiérrez
*Assistant Examiner* — Liton Miah
(74) *Attorney, Agent, or Firm* — Sterne, Kessler, Goldstein & Fox P.L.L.C.

(57) ABSTRACT

A framework for enabling the usage of mobile devices in a remote sensing and reporting role are provided herein. Embodiments of the present invention provide methods and systems for enabling the usage of mobile devices in a remote sensing and reporting role. Embodiments of the present invention use existing mobile network infrastructure to engage mobile users in remote sensing and reporting tasks. Further, embodiments of the present invention enable rapid set up of remote sensing and reporting applications with relatively little technical skills.

31 Claims, 7 Drawing Sheets

FRAMEWORK FOR AGILE MOBILE APPLICATIONS

CROSS-REFERENCE TO RELATED APPLICATIONS

The present application claims the benefit of U.S. Provisional Patent Application No. 60/799,658 filed on May 12, 2006, which is herein incorporated by reference in its entirety.

BACKGROUND OF THE INVENTION

1. Field of the Invention

The present invention relates generally to wireless communication systems. More particularly, the invention relates to a framework for agile mobile applications.

2. Background Art

Today, mobile communications, enabled by mobile telecommunications networks for example, play a prevalent role in our lives. As a result, technologies for enabling computing applications on personal mobile devices continue to advance.

At the same time, remote sensing using wireless sensor networks (WSNs) introduces powerful means for facilitating a variety of tasks including, among many others, disaster relief, environmental sensing, and habitat monitoring.

However, the potentials of remote sensing using WSNs remain confined by the task-specificity and the difficulty of deployment of WSNs. Indeed, not only is a WSN designed according to a specific sensing task that it is to perform, but it also requires ample time for deployment and configuration.

In contrast, personal mobile devices such as mobile phones, for example, enjoy high levels of penetration and have powerful platforms capable of supporting a variety of applications. This makes personal mobile devices very attractive for playing a remote sensing and reporting role.

What is needed, however, is a framework for enabling the usage of mobile devices such as mobile phones, for example, in this remote sensing and reporting role. This includes means for rapidly generating reporting applications, means for rapidly deploying these reporting applications onto mobiles devices, and means for collecting data from the mobile devices.

BRIEF SUMMARY OF THE INVENTION

A framework for enabling the usage of mobile devices in a remote sensing and reporting role are provided herein.

Embodiments of the present invention provide methods, systems, and computer program products for enabling the usage of mobile devices in a remote sensing and reporting role. Embodiments of the present invention use existing mobile network infrastructure to engage mobile users in remote sensing and reporting tasks. Further, embodiments of the present invention enable rapid set up of remote sensing and reporting applications with relatively little technical skills.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

1. Introduction

Today, mobile communications, enabled by mobile telecommunications networks for example, play a prevalent role in our lives. As a result, technologies for enabling computing applications on personal mobile devices continue to advance. At the same time, remote sensing using wireless sensor networks (WSNs) introduces powerful means for facilitating a variety of tasks including, among many others, disaster relief, environmental sensing, and habitat monitoring, for example.

However, the potentials of remote sensing using WSNs remain confined by the task-specificity and the difficulty of deployment of WSNs. Indeed, not only is a WSN designed according to a specific sensing task that it is to perform, but it also requires ample time for deployment and configuration. In contrast, personal mobile devices such as mobile phones, for example, enjoy high levels of penetration and have powerful platforms capable of supporting a variety of applications. This makes personal mobile devices very attractive for playing a remote sensing and reporting role.

What is needed, however, is a framework for enabling the usage of mobile devices such as mobile phones, for example, in this remote sensing and reporting role. This includes means for rapidly generating reporting applications, means for rapidly deploying these reporting applications onto mobiles devices, and means for collecting data from the mobile devices. Further, the framework should exploit, as much as possible, the existing infrastructure and established services of mobile networks.

Embodiments of the present invention, as will be further described below, provide methods, systems, and computer program products for enabling the usage of mobile devices in a remote sensing and reporting role. These embodiments use existing mobile network infrastructure to engage mobile users in remote sensing and reporting tasks. Further, these embodiments enable a rapid set up of remote sensing and reporting applications with relatively little technical skills. Embodiments of the invention as described herein sometimes refer to the use of mobile phones. Such description is provided solely for purposes of illustration and not limitation. Also, as used herein, a mobile telecommunications network is generally any network used to provide data, voice, and/or video communication capabilities to mobile, unfixed devices. As would be understood by a person skilled in the art, HAM radio networks, wireless ad hoc networks, and other (both current and future) technologies may also provide these capabilities. Within the United States, commercial providers of such communication services include, without limitation, companies like Verizon, Sprint, and T-mobile.

2. Enabling Remote Reporting Applications Using Personal Mobile Devices

2.1 System Embodiments

Figure 1:
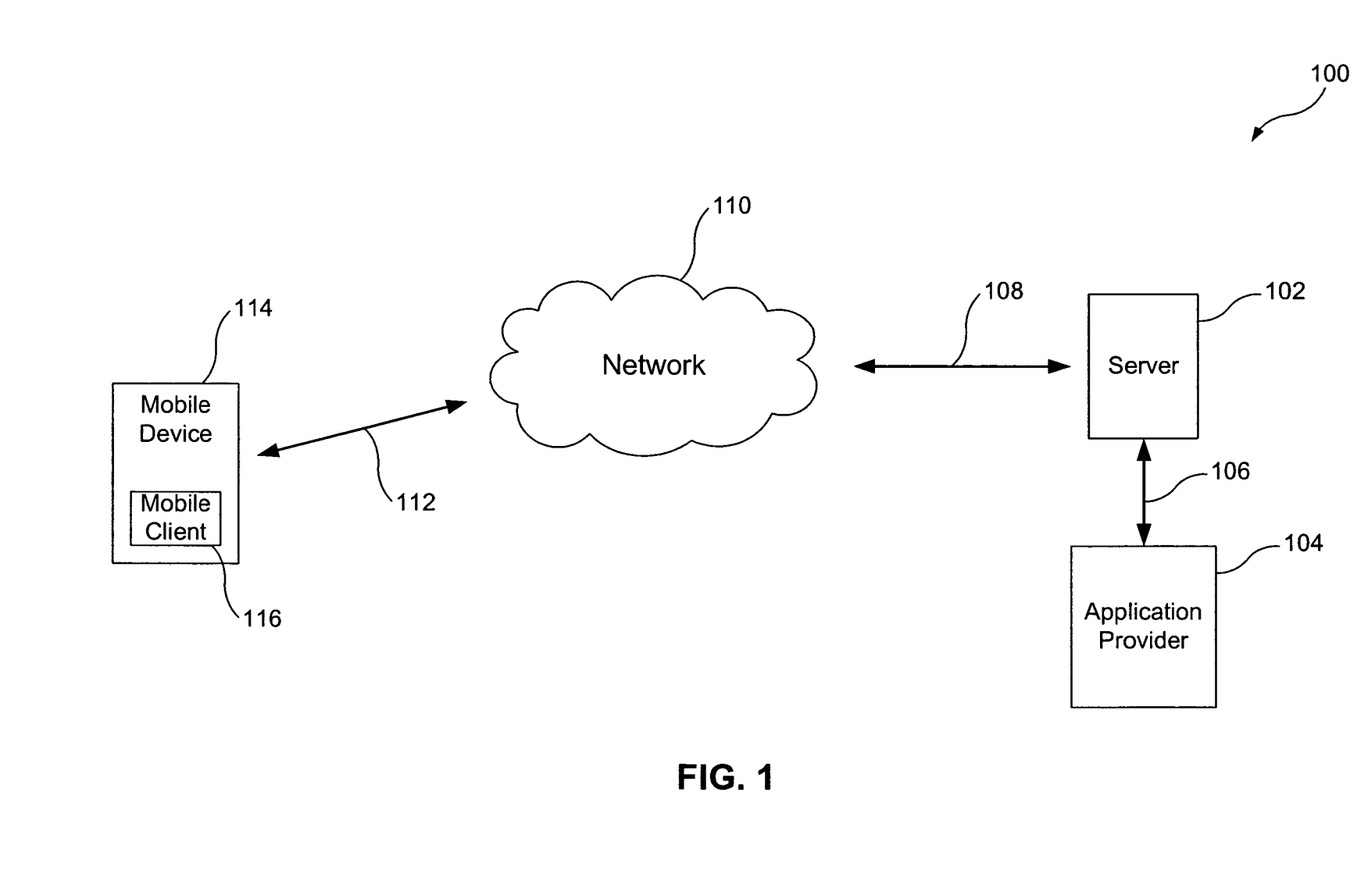
FIG. 1 illustrates a system for enabling remote sensing and reporting using a mobile device, according to an embodiment of the present invention.

FIG. 1 illustrates a system 100 for enabling remote sensing and reporting using a mobile device, according to an embodiment of the present invention. System 100 includes a server 102, an application provider 104, a network 110, and a mobile device 114. According to an embodiment of the present invention, these components of system 100 work together as a platform to enable remote sensing and reporting using mobile devices such as mobile phones, for example.

In an embodiment, server 102 is a localized server capable of hosting applications. Server 102 may be accessible by application provider 104 using an interface 106. Interface 106 may be any communications interface including a public or private, wired or wireless network. Server 102 may also be accessible by mobile device 114. In an embodiment, mobile device 114 accesses server 102 through network 110, which communicates with server 102 using interface 108. Interface 108 may be any communications interface including a public or private, wired or wireless network.

Accordingly, network 110 is a transport network that connects server 102 to mobile device 114. In an embodiment, network 110 is a mobile telecommunications network with fixed infrastructure including switching centers, base station controllers, and base station antennas. In another embodiment, network 110 includes a mobile infrastructure including portable towers and/or aerostats. Network 110 with mobile infrastructure may be deployed over a field of interest when no fixed infrastructure is available. In a further embodiment, network 110 includes a HAM radio-based network, an ad hoc wireless network, a pico-cell network, and/or a nano-cell network.

In an embodiment, mobile device 114 is a registered user of network 110 and communicates with network 110 using a wireless interface 112. Mobile device 114 may be operated by a human user or may be an autonomous self-configurable device. In another embodiment, mobile device 114 includes a mobile client 116, which can be used to execute applications. Mobile client 116 allows a user of mobile device 114 to interact with the application running on the device. In another embodiment, mobile client 116 allows an application to run on mobile device 114, to display information, and to collect input from the user. The application may display any combination of text, images, voice, video, and/or other input forms. Further, mobile client 116 can extract data from devices attached to or built into mobile device 114 including GPS devices and photo units.

Application provider 104 includes means for generating applications. In an embodiment, application provider 104 is a subsystem of server 102. Alternatively, application provider 104 is an independent system, which can be either fixed or mobile. In an embodiment, application provider 104 may be accessible by a human user through a network (e.g., Internet). For example, application provider 104 may be accessible through a web-based interface. In another embodiment, application provider 104 is accessible by a mobile device, such as mobile device 114.

In an embodiment, application provider 104 generates an application for remote sensing and reporting by mobile devices and uses server 102 to store this application. Application provider 104 generates the reporting application according to a reporting need. For example, application provider 104 may generate a reporting application for reporting the sighting of tornadoes by mobile users. Further, application provider 104 may modify the reporting application if the reporting need changes.

In an embodiment, mobile device 114 accesses server 102 to download the generated reporting application. In an embodiment, mobile device 114 registers with server 102 in order to be notified upon the availability of reporting applications matching certain user preferences. Accordingly, mobile device 114 may choose to opt in to engage in remote sensing and reporting tasks. In other embodiments, as in emergency situations, all mobile devices in a given area may be contacted with requests to engage in remote sensing and reporting tasks. Methods and systems for registering mobile devices with server 102 as well as for contacting mobile devices from server 102 are known in the art, and will not be described herein. In an embodiment, these methods and systems include using SMS (Short Message Service) text and binary messages and MMS (Multimedia Message Service) multi-part text and binary messages.

Upon downloading the reporting application, mobile device 114 may use its mobile client 116 to execute the reporting application. Further, in response to input screens from the reporting application, a user of mobile device 114 generates a data report related to the particular reporting task of the reporting application. Mobile device 114 may also use position coordinates from a GPS device attached to it to relay its position information. Mobile device 114 may then transmit the generated data report to server 102, which receives the generated data report, stores it, and then processes it along with reports from other mobile devices to create actionable intelligence.

Figure 2:
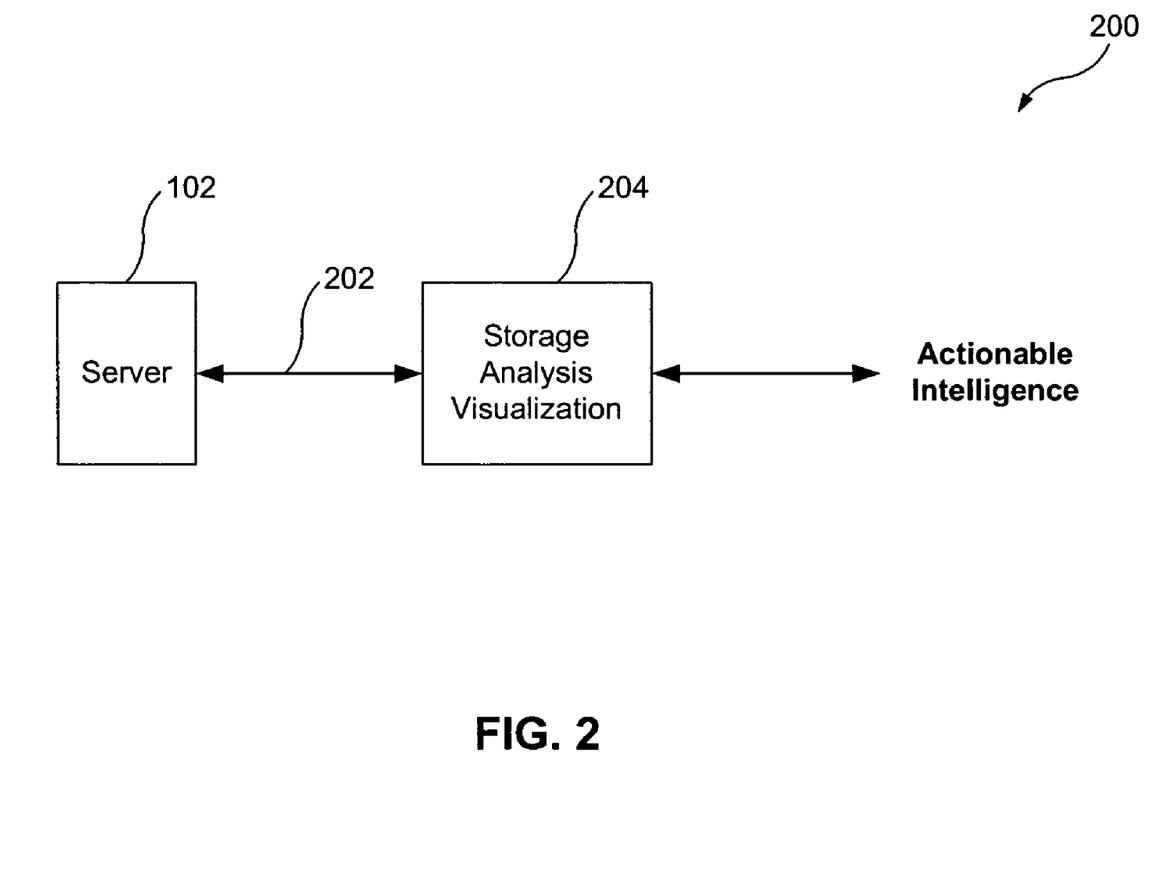
FIG. 2 illustrates a server used in the system of FIG. 1, according to an embodiment of the present invention.

In an embodiment, server 102 includes or has access to a storage, analysis, and visualization module 204, as illustrated in FIG. 2. In an embodiment, server 102 accesses storage, analysis, and visualization module 204 using an interface 202. Interface 202 may be any communications interface including a public or private, wired or wireless network. In an embodiment, module 204 processes data reports received from server 102 to generate actionable intelligence. Based on this actionable intelligence, messages may be sent to devices in the network. This may be done using infrastructure of system 100 and/or other means such as SMS or email. For example, in response to tornado sighting reports from mobile devices in an area A, other mobile devices may be sent cautions to avoid area A. Further, module 204 may integrate reports from other reporting systems with reports received from mobile devices to further improve the quality of the generated actionable intelligence. In another embodiment, module 204 employs complex analysis algorithms to evaluate the quality of data reports received from mobile devices and/or other systems.

Figure 4:
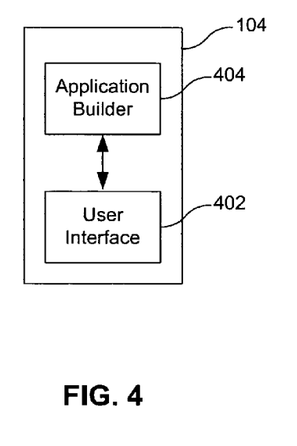
FIG. 4 illustrates an application provider system according to an embodiment of the present invention.

One important aspect of embodiments of the present invention lies in the ability to rapidly generate and deploy reporting applications to mobile devices. While the means for deploying reporting applications to mobile devices exploit existing mobile network infrastructure and services, generating reporting applications makes use of novel methods, systems, and computer program products according to the present invention. As described above, system 100 includes an application provider 104, which is used to generate applications. Application provider 104 may be fixed or mobile. FIG. 4 illustrates application provider 104 according to an embodiment of the present invention.

Application provider 104 includes a user interface 402 and an application builder 404. User interface 402 allows a user to access application builder 404 to create applications. User interface 402 is a user-friendly interface, which requires relatively little technical training. In an embodiment, user interface 402 includes any combination of user input screens to collect user input, according to which the application is to be created. In an embodiment, user interface 402 allows the user to define any application attribute related to the functionality, operation, and/or appearance of the application.

Application builder 404 may be used to generate reporting applications. In an embodiment, application builder 404 receives user input (through user interface 402), which includes attributes of a reporting application. In an embodiment, the reporting application is designed according to a reporting need identified by a user of application provider 104. In another embodiment, application provider 104 may be accessed remotely by another user to generate and deploy a reporting application, according to a reporting need identified by that user. In a further embodiment, a reporting application is generated automatically according to rules specifiable in application provider 104, without user input. For example, in response to hurricane reports, a "hurricane reporting application" can be generated and distributed without any deliberate user action but based on encoded rules.

In an embodiment, using reporting application attributes received from user interface 402, application builder 404 generates a workflow script for the reporting application. In an embodiment, the workflow script describes all aspects of the reporting application according to the specified attributes. In an embodiment, the workflow script is executed to run the reporting application. According to embodiments of the present invention, a workflow script is generated instantaneously once the attributes of the reporting application have been entered by the user.

Accordingly, application provider 104 provides user-friendly and rapid means for generating reporting applications, according to identified reporting needs. Application provider 104 requires relatively little technical training for operation. Coupled with the means for deploying applications to mobile devices and the means for processing data reports from mobile devices, these systems provide a complete framework for enabling the usage of mobile devices for remote sensing and reporting.

2.2 Method Embodiments

Figure 3:
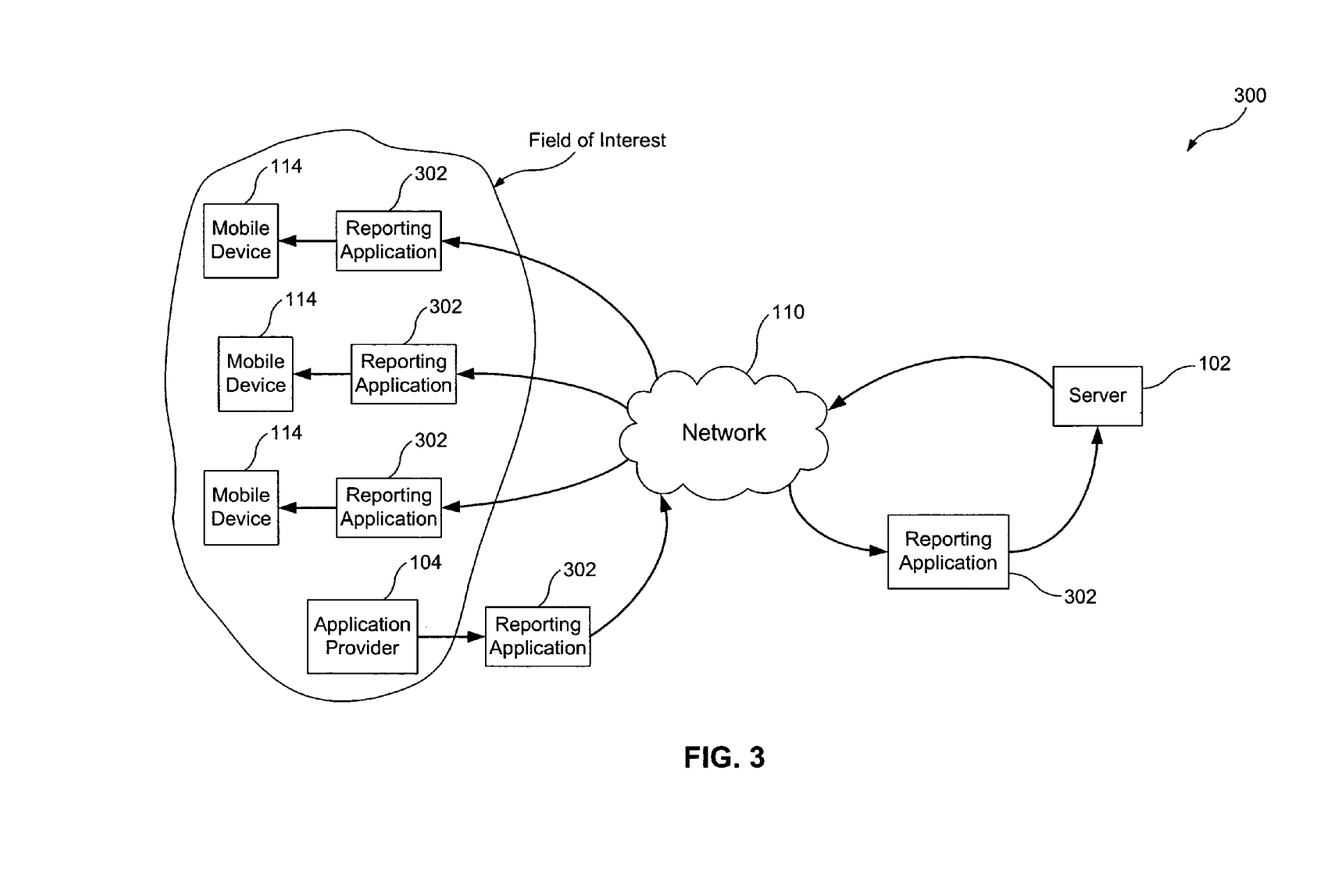
FIG. 3 illustrates an exemplary scenario for deploying a reporting application onto mobile devices, according to an embodiment of the present invention.

FIG. 3 illustrates an exemplary scenario 300 for deploying a reporting application onto mobile devices, according to an embodiment of the present invention. As described above with reference to FIG. 1, a network 110 connects server 102 to mobile devices 114. Further, network 110 connects application provider 104 to server 102. In the embodiment of FIG. 3, application provider 104 is mobile. For example, application provider 104 may be installed on a mobile system or device, such as mobile devices 114.

In an embodiment, application provider 104 identifies a reporting need in a field of interest. Accordingly, application provider 104 generates a reporting application 302 according to the identified reporting need and transmits the generated reporting application to server 102. In an embodiment, application provider 104 uses GPS to include its positional coordinates in the generated reporting application. In another embodiment, well-known cellular-based triangulation techniques are used to generate these positional coordinates.

Application provider 104 uses network 110 to relay the generated reporting application 302 to server 102. Server 102 receives and stores reporting application 302. In an embodiment, server 102 (using other subsystems such as module 204 described in FIG. 2) processes reporting application 302 to determine a reporting field for the identified reporting need. The reporting field defines area coordinates according to the positional coordinates of the application provider 104. The reporting field is used to determine mobile devices that can be used to participate in the particular reporting task.

Once a reporting field has been determined by server 102, all mobile devices registered with server 102 and located within the reporting field receive reporting participation requests through network 110. In an embodiment, server 102 employs resources provided by network 110 to determine the mobile devices that are within the reporting field.

In an embodiment, any mobile device receiving a reporting participation request and wishing to participate in the reporting task replies to server 102 indicating its willingness to participate. Server 102 then launches a transmission of reporting application 302 to the mobile device(s) using network 110. Once the reporting application is successfully received by the mobile device(s), it can be installed and immediately used to report information to server 102. In an embodiment, the mobile devices are operated by human users. In another embodiment, the mobile devices are autonomous self-configurable devices.

Figure 6:
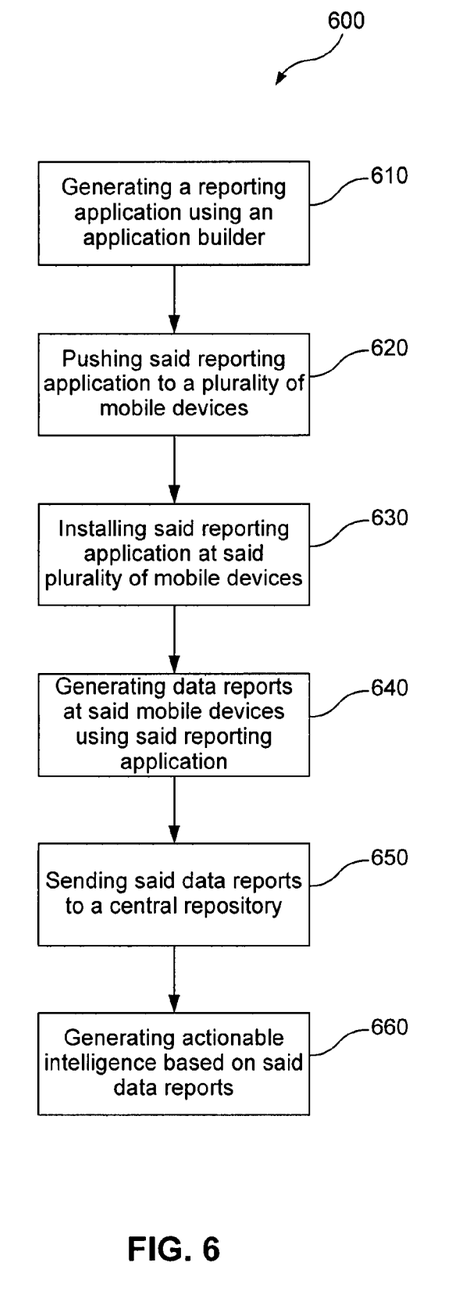
FIG. 6 is a process flowchart for enabling remote sensing and reporting using mobile devices, according to an embodiment of the present invention.

FIG. 6 is a process flowchart 600 for enabling remote sensing and reporting using mobile devices, according to an embodiment of the present invention. Process flowchart 600 begins in step 610, which includes generating a reporting application using an application builder. In an embodiment, step 610 is achieved using an application provider having an application builder and a user interface. The application builder generates the reporting application according to a specific reporting need identified by a user of the application provider. In an embodiment, the application builder generates an application workflow for the reporting application. The user of the application provider may define any aspect of the reporting application using the user interface. In an embodiment, the reporting application is generated using an application generating wizard, which prompts the application generator for input at each step of the application generation process. In another embodiment, the reporting application is generated by building an application script. In a further embodiment, a user of the application provider may select a reporting application from a set of built-in reporting applications or modify a pre-defined reporting application template. In an embodiment, a high-level language is used to generate the application script. In either case, the reporting application can be generated with relatively little technical expertise.

Step 620 includes pushing the reporting application to a plurality of mobile devices. In an embodiment, step 620 is achieved by a server that hosts the reporting application. In an embodiment, the server transmits the reporting application to the mobile devices using a network, such as a mobile telecommunications network, for example. In an embodiment, the mobile devices are registered with the server and have opted to participate in the reporting task.

Step 630 includes installing the reporting application at the mobile devices. In an embodiment, each mobile device includes a mobile client capable of installing and running the reporting application. In an embodiment, the mobile client executes the application workflow of the reporting application in order to run it on the mobile device.

Step 640 includes generating data reports at the mobile devices using the reporting application. In an embodiment, a mobile device user employs a user interface of the reporting application to enter user input in response to queries provided by the reporting application. The user input to the reporting application queries generates a data report by the mobile device. In another embodiment, information from attached devices such as GPS, for example, is incorporated in the generated data report. In an embodiment, the generated data report includes any combination of text, images, voice, video, location information, and other modalities of information. In another embodiment, the mobile device can be configured to automatically respond and provide information in response to a reporting application, without user input.

Step 650 includes sending the data reports to a repository. In an embodiment, once a mobile device data report is generated, it is transmitted by the mobile device to a repository. In an embodiment, the repository is a subsystem of the server hosting the reporting application.

Once a sufficient number of data reports are received at the repository, step 660 includes generating actionable intelligence based on the received data reports. In an embodiment, the repository stores the received data reports, and then forwards them to an analysis module for processing. The analysis module may be a subsystem of the server hosting the reporting application or an independent system. The analysis module processes the data reports to generate actionable intelligence. In an embodiment, the analysis module receives and analyzes data reports generated by different reporting applications but having a common underlying schema, thereby enabling synergy between applications. In another embodiment, the analysis module receives and analyzes data reports having a common underlying schema that is compatible with applications both within and outside of the scope of embodiments of the present invention, thereby enabling synergy between reporting applications generated according to the present invention and other existing applications.

In another embodiment, the analysis module integrates information from external systems with the received data reports to improve the quality of the generated actionable intelligence.

In an embodiment, based on the generated actionable intelligence, messages (e.g., warnings) can be sent to the mobile devices. This can be done using infrastructure of the system that supports process 600 and/or other means, including SMS or email. In another embodiment, based on the generated actionable intelligence, the reporting application can be modified or a new reporting application generated and pushed to the mobile devices to direct the mobile devices to report particular and/or more specific information. For example, in response to actionable intelligence based on reports from a reporting application that indicate the presence of a particular person in a given area, a modified or new reporting application can be generated and pushed to the mobile devices to report information containing a picture of the particular person. In an embodiment, this can be performed automatically, without user input.

2.3 Exemplary Operational Scenario

Figure 5:
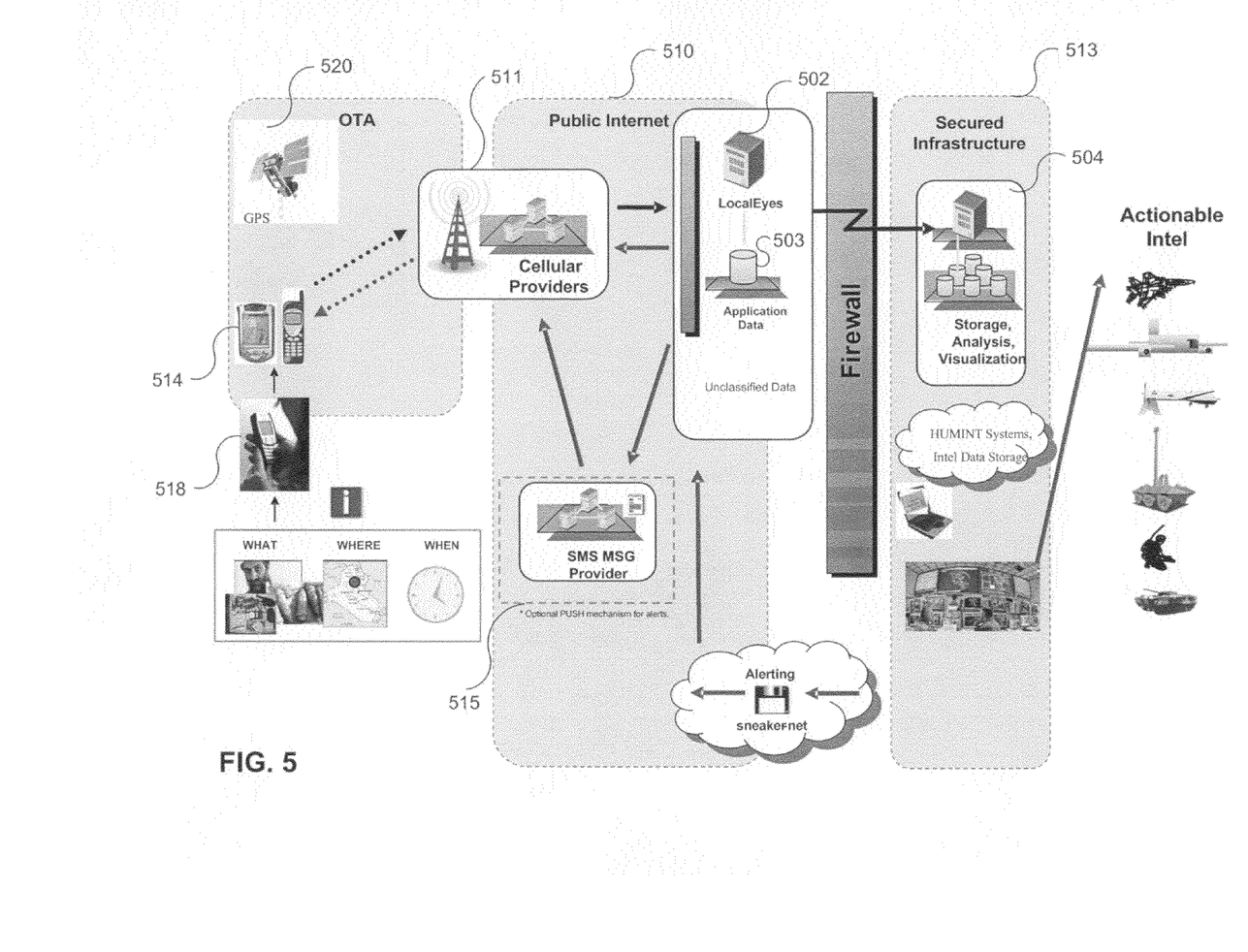
FIG. 5 illustrates an exemplary scenario of remote sensing and reporting using mobile devices, according to an embodiment of the present invention.

FIG. 5 illustrates an exemplary scenario of remote sensing and reporting using mobile devices, according to an embodiment of the present invention. In the exemplary scenario of FIG. 5, a server 502 ("LocalEyes") hosts reporting applications that may be generated by application providers. The LocalEyes server 502 has access to a storage subsystem 503, where application data may be stored. The LocalEyes server communicates with mobile network infrastructure 511 (owned by mobile telecommunications service providers) using a public network 510, such as the Internet, for example, and with a secured infrastructure 513 using a private secured network.

The secured infrastructure 513 includes a storage, analysis, and visualization module 504 and may also have access to information from other external systems. The secured infrastructure 513 generates actionable intelligence based on data reports from mobile devices received through the LocalEyes server. Further, the secured infrastructure 513 may provide the generated actionable intelligence to actuator systems, illustrated in FIG. 5 as battlefield systems.

The LocalEyes server 502 uses the mobile telecommunications network infrastructure 511 to communicate with mobile devices 514 located in a field of interest. Further, the LocalEyes server 502 may use an SMS Message Provider 515 to notify mobile devices of available reporting applications. Mobile devices 514 can receive reporting applications from the LocalEyes server 502 over the mobile telecommunications network. As illustrated in FIG. 5, a user of a mobile device in the field of interest may generate a data report by answering simple queries (e.g., what?, where?, when?) using a user-friendly interface 518. The mobile device may make use of attached devices, such as GPS 520, to aid in the generation of the data report. The mobile device may also use other unique capabilities available thereto such as an accelerometer, a still or video camera, a microphone, and/or a microgyroscope, for example.

Mobile devices 514 relay generated data reports through the mobile telecommunications network 511 to the LocalEyes server 502. In other embodiments, the mobile devices 514 may communicate directly with the LocalEyes server 502 using the Internet 510. The LocalEyes server 502 forwards the received data reports to the secured infrastructure 513 for processing and analysis.

3. Example Computer Implementation

Figure 7:
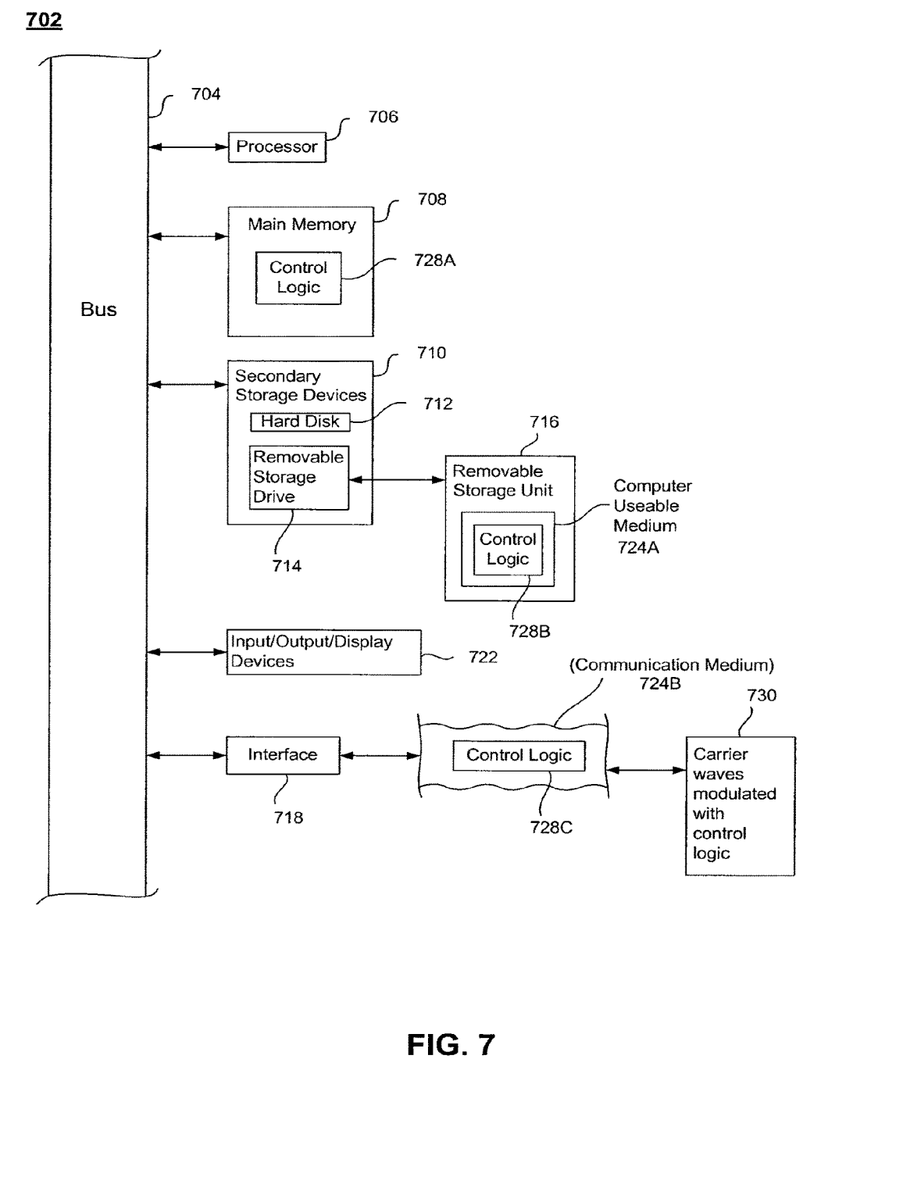
FIG. 7 illustrates an example computer useful for implementing components of the invention.

In an embodiment of the present invention, the system and components of the present invention described herein are implemented using well known computers, such as computer 702 shown in FIG. 7.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, the secondary storage devices 710, and the removable storage unit 716. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for deploying mobile reporting application programs using a system having an application provider and a server, comprising:
   (a) generating, by the application provider, a reporting application program, wherein generating the reporting application program comprises:
   receiving, by the application provider, attributes representative of the reporting application program, wherein the attributes include a reporting need and a geographical field of interest, wherein the reporting need identifies an event regarding which information is needed; and
   creating, by the application provider, an execution script of the reporting application program based on the received attributes;
   (b) determining, by the server, a reporting field based on the geographical field of interest;
   (c) identifying, by the server, a plurality of mobile devices based on the reporting need and the reporting field, wherein said plurality of mobile devices are located within the reporting field;
   (d) pushing, by the server, said reporting application program to said plurality of mobile devices;
   (e) receiving, by the server, data reports from said mobile devices, wherein said data reports are generated by the mobile devices using said reporting application program; and
   (f) sending said data reports by the server to a repository.

2. The method of claim 1, wherein generating the reporting application program comprises generating said reporting application program according to said reporting need.

3. The method of claim 1, wherein said execution script defines successive user input screens of said reporting application program.

4. The method of claim 3, wherein said user input screens are designed using any combination of custom images, text, voice, video, and other modalities.

5. The method of claim 1, wherein creating the execution script of said reporting application program comprises using pre-defined templates.

6. The method of claim 1, wherein step (a) comprises generating said reporting application program using an application generating wizard.

7. The method of claim 1, wherein step (a) comprises generating said reporting application program according to specifiable rules, without user input.

8. The method of claim 1, wherein step (d) comprises transmitting said reporting application program to said plurality of mobile devices using a transport network.

9. The method of claim 8, wherein said transport network is a mobile telecommunications network.

10. The method of claim 8, wherein said transport network includes at least one of portable cell towers, aerostats, pico-cell network, nano-cell network, HAM radio-based network, and ad hoc wireless network.

11. The method of claim 1, further comprising: sending the reporting application program from the application provider to the server.

12. The method of claim 1, further comprising:
   (g) processing said data reports; and
   (h) generating actionable intelligence based on said processed data reports.

13. The method of claim 12, wherein said step of generating actionable intelligence includes generating actionable intelligence based on data reports received from multiple reporting applications and/or from external systems.

14. The method of claim 12, further comprising:
   (i) sending messages to mobile devices based on the generated actionable intelligence.

15. The method of claim 12, further comprising:
   modifying said reporting application based on the generated actionable intelligence; and
   (j) pushing the modified reporting application to the mobile devices.

16. The method of claim 1, wherein the field of interest is a geographical area.

17. The method of claim 1, further comprising:
(g) modifying said reporting application program when said reporting need changes; and
(h) repeating step (d).

18. The method of claim 1, wherein one or more of said mobile devices are operated by human users.

19. The method of claim 1, wherein one or more of said mobile devices require no human operators.

20. The method of claim 1, wherein said data reports include any combination of text, images, voice, video, location information, and other modalities of information.

21. A system for deploying mobile reporting application programs, comprising:
a first module operable to generate a reporting application program, wherein said first module comprises:
a second module operable to receive attributes representative of the reporting application program, wherein the attributes include a reporting need and a geographical field of interest, the reporting need identifies an event regarding which information is needed, and to create an execution script of the reporting application program based on the attributes;
a third module operable to determine a reporting field based on the geographical field of interest;
a fourth module operable to identify a plurality of mobile devices based on the reporting need and the reporting field, wherein said plurality of mobile devices are located within the reporting field;
a fifth module operable to push said reporting application program to said plurality of mobile devices;
a sixth module operable to store data reports generated using said reporting application program by said mobile devices; and
a seventh module operable to process said data reports to generate actionable intelligence.

22. The system of claim 21, wherein said first module includes an application builder.

23. The system of claim 21, wherein said fifth module includes a transport network interface.

24. The system of claim 21, wherein said sixth module is accessible by said first module to store a generated reporting application program.

25. The system of claim 24, wherein said sixth module is accessible by said mobile devices to download said reporting application program.

26. The system of claim 21, wherein said seventh module includes an eight module operable to integrate information from external systems to generate said actionable intelligence.

27. The system of claim 21, wherein said seventh module includes an eight module operable to process data reports generated by different reporting application programs, thereby enabling synergy between applications.

28. The system of claim 21, wherein the field of interest is a geographical area.

29. A computer program product comprising a tangible computer useable medium having computer program logic recorded thereon for enabling one or more processors to perform a method for deploying mobile reporting application programs, the method comprising:
generating, by an application provider a reporting application program, wherein generating the reporting application program comprises:
receiving, by the application provider, attributes representative of the reporting application program, wherein the attributes include a reporting need and a geographical field of interest, wherein the reporting need identifies an event regarding which information is needed; and
creating, by the application provider, an execution script of the reporting application program based on the attributes;
determining, by a server, a reporting field based on the geographical field of interest;
identifying, by the server, a plurality of mobile devices based on the reporting need and the reporting field, wherein said plurality of mobile devices are located within the reporting field;
pushing, by the server, said reporting program to said plurality of mobile devices;
receiving, by the server, data reports from said mobile devices, wherein said data reports are generated by the mobile devices using said reporting application program; and
sending said data reports by the server to a repository.

30. The computer program product of claim 29, wherein the method further comprises:
generating actionable intelligence based on said data reports.

31. The computer program product of claim 29, wherein the field of interest is a geographical area.

* * * * *

UNITED STATES PATENT AND TRADEMARK OFFICE
CERTIFICATE OF CORRECTION

| | | |
|---|---|---|
| PATENT NO. | : 8,260,278 B2 | Page 1 of 1 |
| APPLICATION NO. | : 11/790421 | |
| DATED | : September 4, 2012 | |
| INVENTOR(S) | : Landsman et al. | |

It is certified that error appears in the above-identified patent and that said Letters Patent is hereby corrected as shown below:

Column 10, Line 62, "modifying" should be replaced with --(i) modifying--.
Column 12, Line 2, "eight" should be replaced with --eighth--.
Column 12, Line 6, "eight" should be replaced with --eighth--.
Column 12, Line 15, "provider" should be replaced with --provider,--.

Signed and Sealed this
Twentieth Day of November, 2012

David J. Kappos
*Director of the United States Patent and Trademark Office*